(12) United States Patent
Neuhaus et al.

(10) Patent No.: US 7,899,136 B2
(45) Date of Patent: Mar. 1, 2011

(54) FREQUENCY-OFFSET ESTIMATION

(75) Inventors: Holger Neuhaus, Munich (DE);
Bertram Gunzelmann, Königsbrunn (DE); Michael Weber, Preising (DE)

(73) Assignee: Infineon Technologies AG, Neubiberg (DE)

( * ) Notice: Subject to any disclaimer, the term of this patent is extended or adjusted under 35 U.S.C. 154(b) by 971 days.

(21) Appl. No.: 11/743,983

(22) Filed: May 3, 2007

(65) Prior Publication Data

US 2008/0273635 A1    Nov. 6, 2008

(51) Int. Cl.
*H04L 27/00* (2006.01)
(52) U.S. Cl. ........................ 375/326; 375/346
(58) Field of Classification Search ............... 375/326, 375/344, 346, 316, 335, 252; 370/252, 201, 370/332, 342
See application file for complete search history.

(56) References Cited

U.S. PATENT DOCUMENTS 7,643,587 B2 * 1/2010 Tanaka et al. ............... 375/344
2006/0251190 A1 * 11/2006 Wang et al. ................. 375/330
2007/0036248 A1 * 2/2007 Kumura ...................... 375/346
2007/0140203 A1 * 6/2007 Qiao ........................... 370/342

* cited by examiner

*Primary Examiner*—Khai Tran
(74) *Attorney, Agent, or Firm*—Eschweiler & Associates, LLC (57) ABSTRACT

A device for calculating an overall frequency-offset estimate from a plurality of frequency-offset estimates includes a receiver unit configured to receive a plurality of data streams, a phase shift estimation unit configured to generate a phase shift quantity representative of a phase shift over a number of consecutive data samples in the respective data stream, and a phase shift processing unit coupled to the phase shift estimation unit and configured to calculate a quantity related to the signal-to-noise ratio associated with a data stream on the basis of the respective phase shift quantity. Further, the device includes a frequency-offset estimation unit configured to generate frequency-offset estimates associated with the respective data streams, and a combiner configured to calculate an overall frequency-offset estimate on the basis of the frequency-offset estimates and on the basis of the quantities related to the signal-to-noise ratios.

27 Claims, 5 Drawing Sheets

FREQUENCY-OFFSET ESTIMATION

FIELD OF THE INVENTION

The invention relates to the estimation of an overall frequency-offset on the basis of a plurality of frequency-offset estimates and further to the estimation of a quantity representative of a signal-to-noise ratio. In particular, the invention relates to communications systems and receiver.

BACKGROUND OF THE INVENTION

In mobile communication systems a mobile station may be connected to multiple base stations at the same time. In this case, frequency-offset correction in the mobile station is typically not done separately for each base station. Instead, frequency offset correction aims at correcting offsets of the frequency generating device. Usually, only a single device is used as a reference for frequency generation. Therefore, if frequency-offset estimates are obtained by measurement from a plurality of signal sources such as, for example, base stations to which the mobile station is connected, a strategy has to be devised of how to combine these multiple frequency-offset estimates into a single value, i.e. an overall frequency-offset estimate. As the reception performance and transmit frequency offset on the uplink of a mobile station sensitively depends on the compensation of frequency-offsets, an efficient strategy for combining the frequency-offset estimates into a single value is desirable.

Further, quantities representative of signal-to-noise ratios of signals in a radio receiver are known to be necessary for many applications and are used in a radio receiver for a variety of computations. Therefore, efficient algorithms and circuitry to generate signal-to-noise estimates in a radio receiver are desirable.

BRIEF DESCRIPTION OF THE DRAWINGS

Aspects of the invention are made more evident by way of example in the following detailed description of embodiments when read in conjunction with the attached drawing figures, wherein.

DETAILED DESCRIPTION OF THE INVENTION

In the following description further aspects and embodiments of the present invention are disclosed. In addition, reference is made to the accompanying drawings, which form a part thereof, and in which is shown by way of illustration, one or more examples in which the invention may be practiced. The embodiments herein provide a better understanding of one or more aspects of the present invention. This disclosure of the invention is not intended to limit the features or key-elements of the invention to a specific embodiment. Rather, the different elements, aspects and features disclosed in the embodiments can be combined in different ways by a person skilled in the art to achieve one or more advantages of the present invention. It is to be understood that other embodiments may be utilized and structural or logical changes may be made without departing from the scope of the present invention. The elements of the drawing are not necessarily to scale relative to each other. Like reference numerals designate corresponding similar parts.

At a receiver, the actual frequency of the received signal may, for various reasons, be different from a local frequency used in the receiver to process the received signal, thereby causing a frequency-offset in the receive signal path of the mobile receiver. For instance, frequency shifts in the received radio signal or detuning of the local oscillator of the receiver may account for the generation of such frequency-offset in the receiver. A frequency-offset in the receiver significantly impairs the performance of the receiver and may lead to a transmit center-frequency offset that exceeds allowed tolerance levels.

In the following, according to a first embodiment, an improved combining of frequency-offset estimates in a receiver is described. The embodiments described below may be employed in various mobile communications systems, among them CDMA (Code Division Multiple Access) systems such as, for example, UMTS (Universal Mobile Telecommunications System) or mobile communications systems using other types of multiple access schemes, for example, GSM (Global System for Mobile Communications). Communications systems considered below may be, for example, multi-cell systems or single cell systems comprising multiple transmitters.

Figure 1:
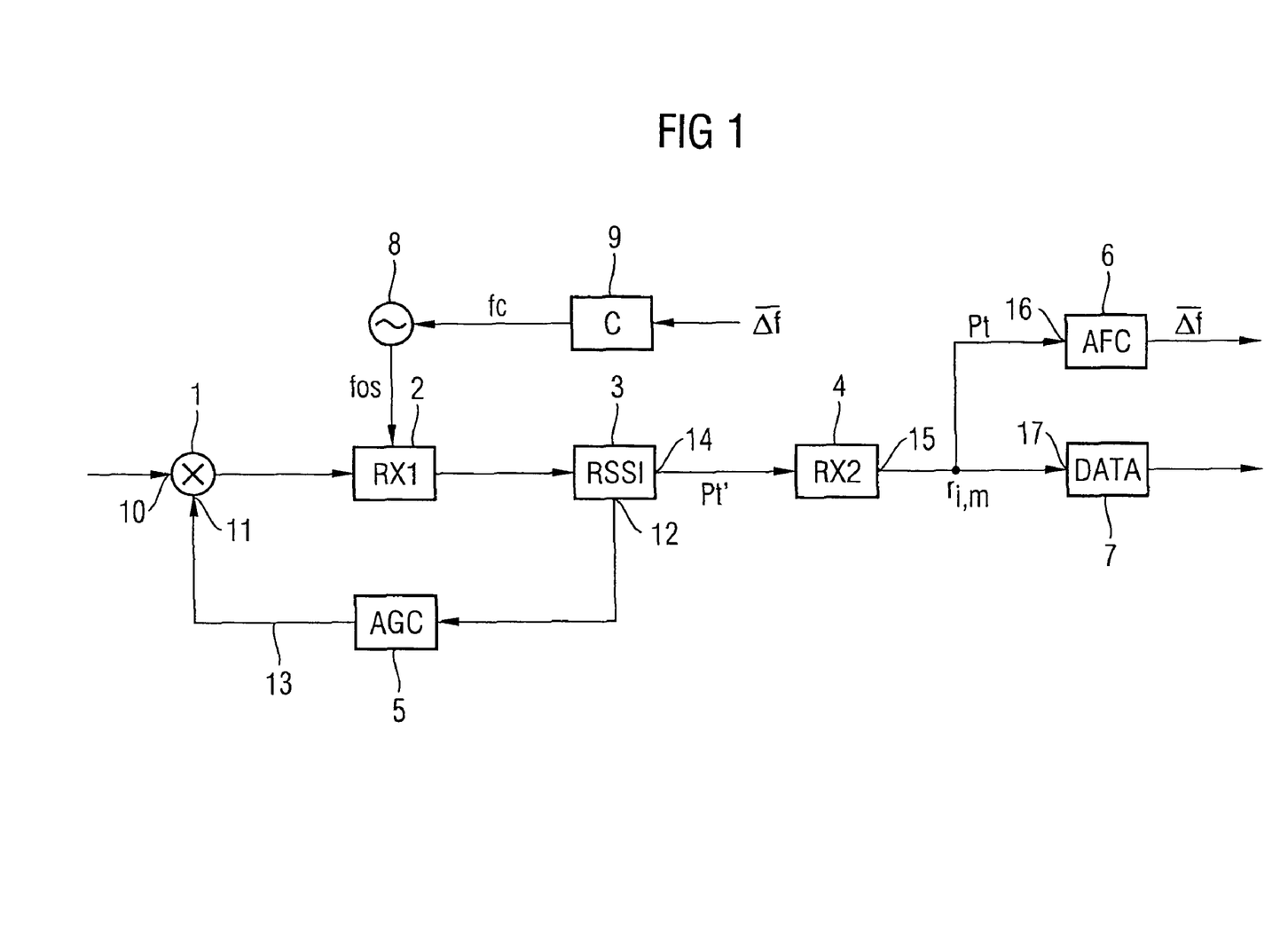
FIG. 1 is a block diagram showing basic functional blocks of a receiver.

FIG. 1 illustrates basic functional blocks of a receiver, for example, a mobile receiver. The receive signal path of the receiver may comprise an amplification stage 1, a first reception section (RX1) 2, a received signal strength indicator (RSSI) unit 3, an automatic gain control (AGC) unit 5, a second reception section (RX2) 4, an automatic frequency control (AFC) unit 6 and a data processing unit (DATA) 7.

Amplification stage 1, first reception section 2, RSSI unit 3 and AGC unit 5 form a feedback loop used for received signal power control. More specifically, amplification stage 1 receives at input 10 an input signal provided by a receiver input. The receiver input may be an antenna (not shown) followed by optional circuitry such as filters and/or additional signal preprocessing units. The input signal is amplified (e.g., multiplied) by a power control signal connected to the second input 11 of the amplification stage 1. An output of the amplification stage 1 is fed into the first reception section 2 of the receiver. The first reception section 2 typically comprises the RF (Radio Frequency) part of the receiver. Thus, as known in the art, the input signal is down-converted to an intermediate frequency (IF) band or the baseband. Down-conversion is typically done by a mixer (not shown) which is operated by a local oscillator 8 outputting an oscillator signal of frequency $f_{os}$. Further, the first reception section 2 may comprise filter stages and other signal processing units as known in the art.

An output signal of the first reception section 2 is fed into the RSSI unit 3. The RSSI unit 3 generates an output 12 which is representative of the signal strength or signal power of the received signal. The output 12 of the RSSI unit 3 is coupled to an input of the AGC unit 5. The AGC unit 5 compares the output 12 of the RSSI unit 3 to a target value and generates an amplification control signal 13 in response to the comparison result. The amplification control signal 13 is fed into a control input 11 of the amplification stage 1 and thus is used to control the received signal power amplification of the receiver. In other words, the feedback loop comprising the amplification stage 1, the first reception section 2, the RSSI unit 3 and the AGC unit 5 establish a regulation circuit which is operative to adjust the signal power in the received signal data stream at the signal output 14 of the RSSI unit 3 to a fixed, known energy target level Pt'.

The signal output 14 of the RSSI unit 3 is fed into the second reception section 4. The second reception section 4 of the receiver may comprise a demodulator for reconstructing data samples (also termed symbols in the following) contained in the received signal data stream. To this end, the second reception section 4 may for instance comprise parts of a RAKE receiver for detection and preprocessing of signal contributions received over different propagation paths of a radio channel. Further, the second reception section 4 may be equipped with a descrambling and a despreading stage used for extracting the wanted data and control/pilot signals from the received signal which is a superposition of all data and control signals picked up at the input. As known in the art, in CDMA communications systems, user signals (i.e. logical channels per base station and user) are separated by different spreading codes. Thus, user signal separation in the receiver may be performed by despreading the received signal.

Further, the second reception section 4 provides for separation of signals transmitted from different signal sources such as base stations. In CDMA communications systems, each signal source uses an individual scrambling code for coding signals to be transmitted. Therefore, separation of signals received from different signal sources in the receiver may be accomplished by descrambling the received signal.

In communications systems using other techniques for multi-user access and/or base station identification, it is likewise possible to distinguish between signals which are intended for different users and/or received from different signal sources (e.g., base stations), respectively. In other words, at an output 15 of the second reception section 4, a user-specific and signal source-specific signal may be provided. Such signal may be represented by a stream of complex-valued symbols $r_{i,m}$ associated with the particular mobile station, where i denotes the time index and m identifies the base station, m=1, ..., M, from which the symbol $r_{i,m}$ has been transmitted.

The output 15 of the second reception section 4 is coupled to an input 16 of the AFC unit 6 and an input 17 of the data processing unit 7. Data processing in the data processing unit 7 may be accomplished according to known techniques in the art (e.g., may comprise de-interleaving, channel-decoding etc.) and will not be described in more detail in the following. In the AFC unit 6, the symbols $r_{i,m}$ are processed to calculate an overall frequency-offset estimate $\overline{\Delta f}$. The overall frequency-offset estimate $\overline{\Delta f}$ is used as input for a control unit 9 which generates a frequency control signal $f_c$ for adjusting the frequency $f_{os}$ generated by, for example, an oscillator 8. Thus, the first reception section 2, RSSI unit 3, second reception section 4, AFC unit 6, control unit 9 and oscillator 8 form a frequency closed-loop control circuit which is operable to maintain $\overline{\Delta A}=0$. The control unit 9 may be implemented by a look-up table or a conversion function and affects the control response of the frequency closed-loop control circuit, in one embodiment. In more general terms, the overall frequency-offset estimate $\overline{\Delta f}$ may be used to control the processing of the received signal in the mobile receiver.

Various modifications are feasible for implementing the frequency closed-loop control circuit according to the invention. For instance, the frequency control signal $f_c$ may be input to a frequency correction stage (not shown) instead of oscillator 8. The frequency correction stage may be arranged at any point in the receive signal path between the antenna and the input 17 of the data processing unit 7. Such frequency correction stage may either be located in the analog part or in the digital part of the receiver. In the latter case, frequency correction may for instance be performed in the second reception section 4 by means of, for example, a digital frequency correction circuit (not shown). In this regard, it is to be noted that analog-to-digital conversion is typically performed in the first reception section 2 of the receiver but may generally be performed at any convenient point in the receive signal path shown in FIG. 1.

Figure 2:
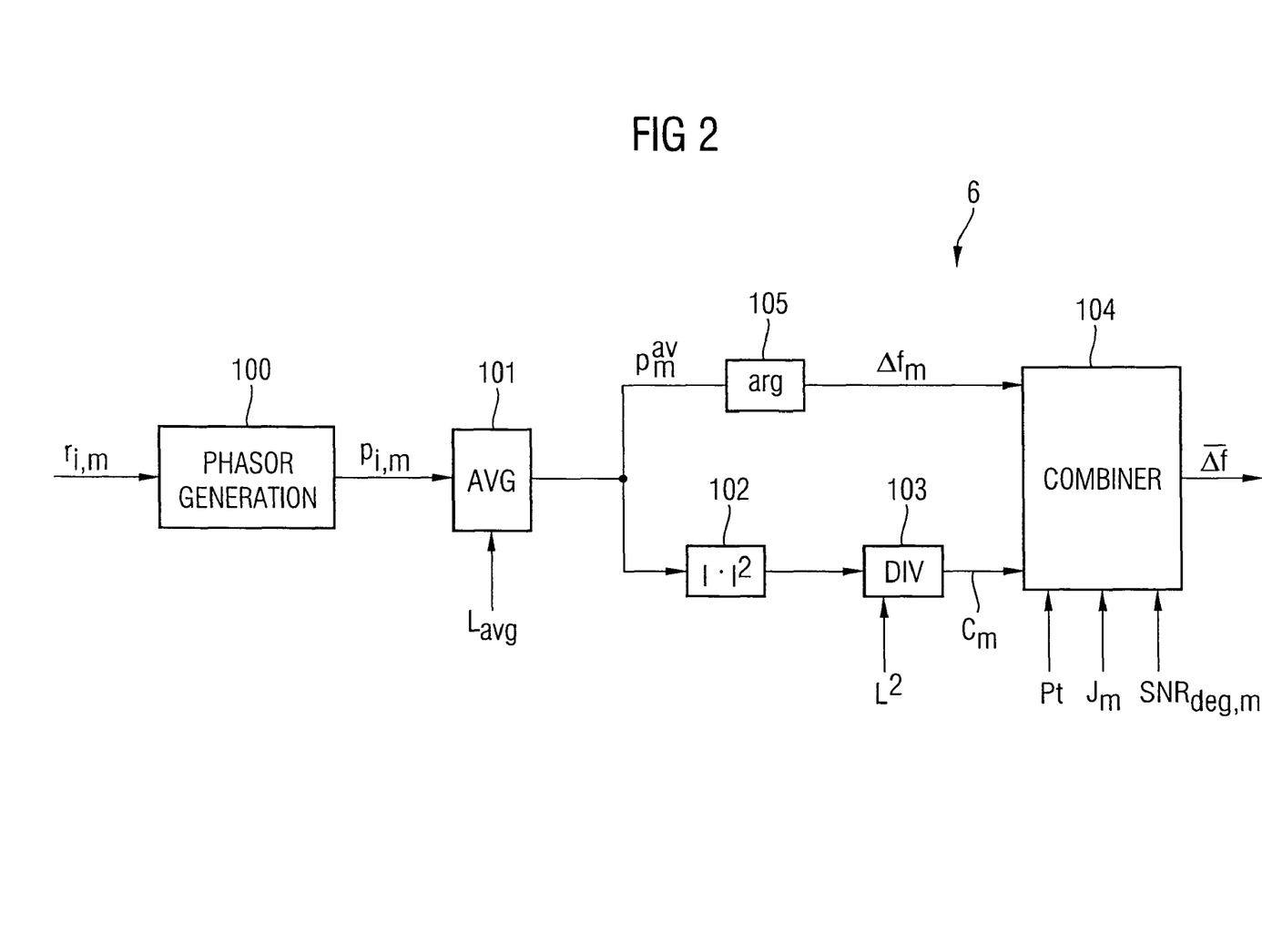
FIG. 2 is a block diagram of the automatic frequency control unit shown in FIG. 1.

FIG. 2 illustrates by way of example the design of the AFC unit 6 according to one embodiment. The AFC unit 6 comprises a phasor generation unit 100, an averaging unit (AVG) 101, a unit 102 computing the squared magnitude of the complex phasors, a divider (DIV) 103, a combiner 104 and an argument unit 105. The phasor generation unit 100 computes on the basis of the input symbols $r_{i,m}$ complex-valued phasors $p_{i,m}$. Phasor $p_{i,m}$ may be defined in one embodiment by $$p_{i,m} = r_{i,m} \cdot r^*_{i-D,m} \tag{1}$$

and is the product of symbol $r_{i,m}$ and the conjugate complex of a preceding symbol $r_{i-D,m}$ (associated with the same signal source m). D is an integer and may typically be chosen to be D=1. The argument of phasor $p_{i,m}$, i.e. $\arg(p_{i,m})$, is indicative of a phase shift between actual symbol $r_{i,m}$ and preceding symbol $r_{i-D,m}$.

Phasors $p_{i,m}$ are fed into the averaging unit 101. In the averaging unit, phasors $p_{i,m}$ are averaged or summed over an averaging length $L_{avg}$ according to $$p_m^{av} = \sum_i^{L_{avg}} p_{i,m}. \tag{2}$$

The averaged phasors $p_m^{av}$ may be used twofold, namely for computing frequency-offsets $\Delta f_m$ associated with the symbol streams $r_{i,m}$ and for computing quantities representative of a signal-to-noise ratio associated with the symbol streams $r_{i,m}$.

To generate an estimate of the frequency-offset $\Delta f_m$, the averaged phasors $p_m^{av}$ are fed into the argument unit 105. Argument unit 105 calculates the argument—i.e. the phase or angle—of each averaged phasor $p_m^{av}$, which is proportional to the frequency-offset $\Delta f_m$ according to $\Delta f_m = \arg(p_m^{av})/(2\pi \cdot L_{avg} \cdot T_{sym})$. Note that normalizing by the factor $(2\pi \cdot L_{avg} \cdot T_{sym})^{-1}$ is not depicted in FIG. 2. Further note that for $D \neq 1$, $D \cdot T_{sym}$ has to be used instead of $T_{sym}$.

To generate quantities representative of the signal-to-noise ratios, the averaged phasors $p_m^{av}$ are fed into the square unit 102 followed by the divider 103. At the output of the divider 103, a quantity $C_m$ which relates to the signal-to-noise ratio associated with the symbol stream $r_{i,m}$ is output.

In the following, it is shown that a quantity related to the signal-to-noise ratio associated with the symbol stream $r_{i,m}$ may be computed on the basis of phasors $p_{i,m}$. A quantity related to the signal-to-noise ratio may be any quantity which is related to the signal-to-noise ratio as a meaningful metric, particularly a quantity which translates into the signal-to-noise ratio by a unique functional relationship. To simplify notation, the index m is dropped because the computation is identical for symbols from each signal source (e.g. base station) m.

The energy of the averaged phasor $p^{av}$ is the square of the absolute value of the complex-valued averaged phasor $p^{av}$ and can be written as the sum of the square of the averaged phasor's real and imaginary part, i.e.

$$Q = |p^{av}|^2 = re(p^{av})^2 + im(p^{av})^2. \tag{3}$$

This energy relates to the signal-to-noise ratio of the signal. It is assumed that the receiver uses ideal automatic gain control based on RSSI measurements on chip level before base station separation and user separation (e.g., descrambling and despreading). To simplify matters, it is further assumed that all non-wanted signal parts contribute either orthogonally (e.g., are cancelled by despreading) or appear as white Gaussian random noise (such as, for example, signals from base stations on different scrambling codes). The following derivation uses the special case of a CDMA receiver.

The following notation is used below:
E The wanted-signal energy per chip
N The noise energy per chip
SNR=E/N The signal-to-noise ratio on chip-level
$L_{corr}$ Spreading factor (number of chips per symbol)
$L_{avg}$ Averaging length for phasors
$\Delta f$ frequency-offset
$T_{sym}$ Symbol sampling time
Pt' AGC energy target level per chip at the output of the AGC feedback loop The signal energy at the output of the AGC feedback loop is the AGC energy target level, i.e.

$$Pt'=E+N \qquad (4)$$

with $$N=Pt'/(1+SNR)$$

$$E=Pt'-N \qquad (5)$$

A frequency-offset of $\Delta f$ reduces the average energy per chip E after despreading over $L_{corr}$ values (corresponding to $T_{sym}$) to a "degraded" average energy per chip $E_{deg}$ according to $$E_{deg}*L_{corr}^2=E*|\mathrm{sinc}(\Delta f*T_{sym})|^2*L_{corr}^2 \qquad (6)$$

For the quality indication of frequency-offset estimates, a degraded signal-to-noise ratio can be defined by $$SNR_{deg}=E_{deg}/N \text{ with } SNR_{deg}<SNR \qquad (7)$$

The squared averaged phasor energy Q can finally be expressed by $$Q = 4(L^2 E_{deg}^2 + 2LNE_{deg} + LN^2) \qquad (8)$$
$$= 4(Pt/(1+SNR))^2 L^2 SNR_{deg}^2 \begin{pmatrix} 1+2/(LSNR_{deg})+ \\ 1/(LSNR_{deg}^2) \end{pmatrix}$$

with $$L = L_{corr}^2 L_{abg}.$$

Pt takes into account any possible power scaling by the second reception section 4, i.e. may be interpreted as the energy target level per chip downstream of the second reception section 4. If the second reception section 4 does not introduce any power scaling, Pt=Pt'.

A first approximation of this term can be derived on the basis of the following assumptions:

$SNR \ll 1$ ($\Rightarrow SNR_{deg} \ll 1$)

$L*SNR_{deg} \gg 2$.

Under these assumptions, equation (8) yields $$Q=4Pt^2(SNR_{deg}^2 L^2+L). \qquad (9)$$

A second even simpler approximation is found on the basis of more stringent assumptions:

$SNR \ll 1$ ($\Rightarrow SNR_{deg} \ll 1$)

$L*SNR_{deg} \gg 2$ $L*SNR_{deg}^2 > 1$

Under these assumptions, equation (8) yields $$Q=4Pt^2 L^2 SNR_{deg}^2. \qquad (10)$$

As it is apparent from equation (10), the energy Q of the averaged phasor is proportional to the square of the degraded signal-to-noise ratio $SNR_{deg}$ if L is large enough. As an example, in UMTS, when using the common pilot channel symbols as input symbol stream $r_{i,m}$ from each base station m, the spreading factor has a fixed value of $L_{corr}$=256. Thus, $L_{avg}$ may be chosen such that equation (10) is roughly satisfied (note that in many cases not necessarily exact results are required). Using for instance an average length of $L_{avg}$=150 corresponding to one UMTS frame, the approximation set out in equation (10) holds for about $-34$ dB$<SNR_{deg}<-10$ dB. Translated from chip-level to symbol-level, the range of the degraded signal-to-noise ratio $SNR_{deg}$ is from $-10$ dB to $+14$ dB. This range should be fully sufficient to provide differentiation between different signal-to-noise ratios of frequency-offset estimates.

The averaging length $L_{avg}$ may be variable and be chosen to be different for different measurements. For this reason and to further limit the dynamic range of the results, the energy Q of the averaged phasor may be divided by $L^2$. This is done in the divider 103 according to $$C=Q/L^2. \qquad (11)$$

As the AGC energy target level Pt' and thus the scaled energy target level Pt are likely to be fixed values, C is then a quantity representative of the signal-to-noise ratio of the processed signal irrespective of the used average length $L_{avg}$.

Figure 3:
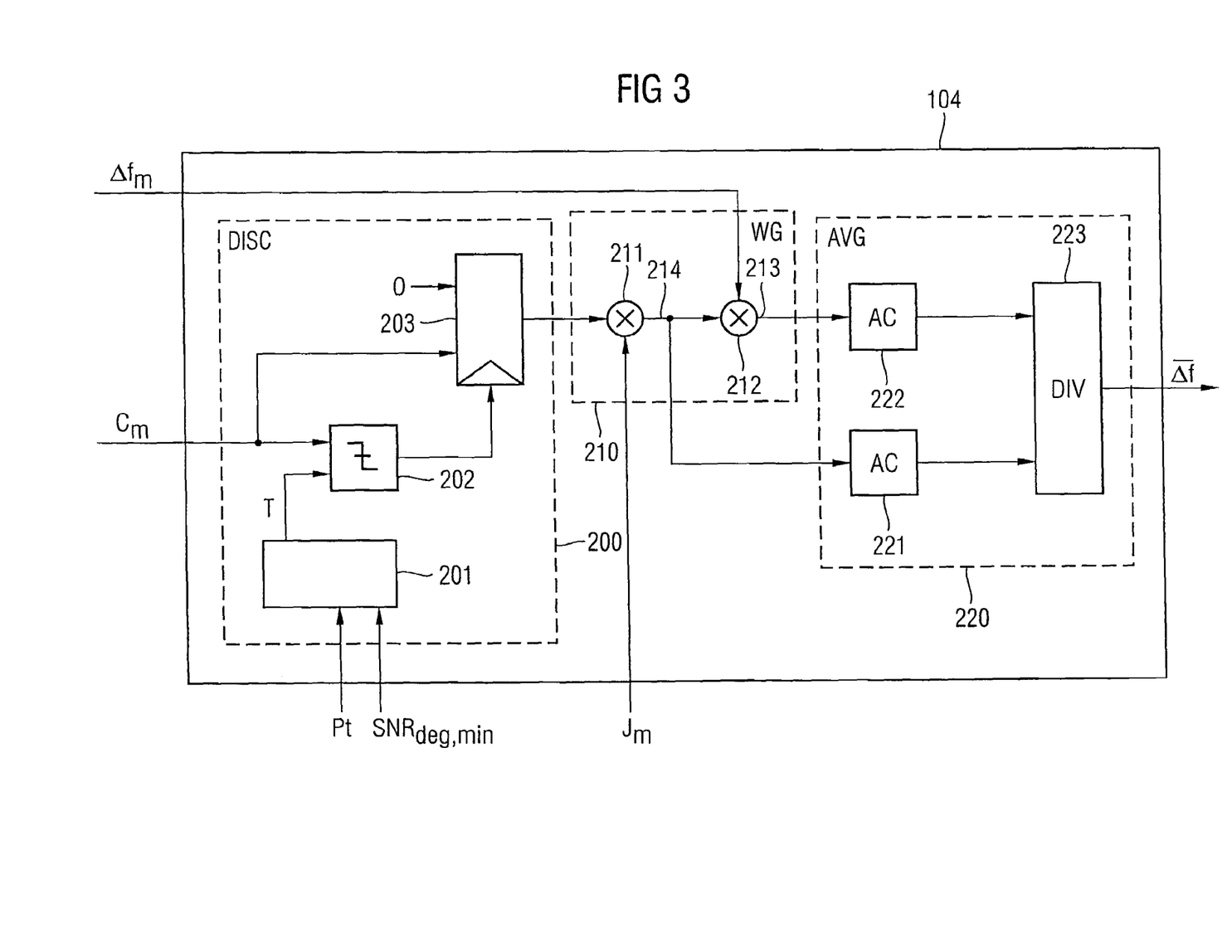
FIG. 3 is a schematic illustration of an embodiment of the combiner shown in FIG. 2.

FIG. 3 illustrates an exemplary embodiment of the combiner 104. Combiner 104 may comprise an optional discarding unit (DISC) 200, a weighting unit (WG) 210 and an averaging unit (AVG) 220.

The discarding unit 200 is operable to discard frequency estimates $\Delta f_m$ having a degraded signal-to-noise ratio $SNR_{deg}$ lower than a required minimum $SNR_{deg,min}$. To this end, the discarding unit 200 may comprise a multiplier 201, a comparator 202 and a multiplexer 203. The multiplier 201 is configured to compute a threshold value T according to $$T=4SNR_{deg,min}^2 Pt^2 \qquad (12)$$

in one embodiment, wherein $C_m$ is compared to threshold value T in comparator 202. If $C_m<T$, the corresponding frequency-offset $\Delta f_m$ has a low confidence because it has been calculated on the basis of noisy data with a degraded signal-to-noise ratio $SNR_{deg}$ (which is represented by $C_m$) lower than the minimum degraded signal-to-noise ration $SNR_{deg,min}$. In this case, $C_m$ is set to $C_m$=0 by multiplexer 203. It is to be noted that threshold values T different from the threshold value T indicated in equation (12) may be used.

Values of $C_m$ as output by the discarding unit 200 are input into the weighting unit 210. The weighting unit 210 may comprise a first multiplier 211 and a second multiplier 212 connected in series. The (optional) first multiplier 211 multiplies each value $C_m$ by a weighting factor $J_m$, in one embodiment. Weighting factor $J_m$ may provide for a source-importance weighting adjustment which introduces priorities with respect to the signal content. More specifically, a symbol stream $r_{i,m}$ of one specific signal source (e.g. base station) $\overline{m}$ may be of higher importance for signal demodulation in the receiver because, for instance, base station $\overline{m}$ offers a specific service. As an example, base station $\overline{m}$ may provide HSDPA (High Speed Downlink Packet Access) in an UMTS communications system. Then, it may be desirable to optimize the frequency adjustment in the receiver such that the compensation of $\Delta f_{\overline{m}}$ is favored over the compensation of frequency-offsets $\Delta f_m$ of signals from other signal sources $m \neq \overline{m}$ in order to better exploit the enhanced service HSDPA. To this end, $J_{\overline{m}}$ is chosen to $J_{\overline{m}} > 1$, whereas $J_m = 1$ for $m \neq \overline{m}$. Source importance weighting as explained above may be for instance accomplished in response to service indicators which are transmitted by the signal sources and which are translated in the receiver into service mode flags (e.g., a HSDPA-mode flag for a base station which offers HSDPA). Then, appropriate weighting values $J_m$ are applied based on the activated flags in the receiver. As will be detailed further below, different weighting schemes may be used for $J_m$.

The second multiplier 212 multiplies the output of the first multiplier 211 by $\Delta f_m$. Thus, the weighting unit 210 generates at an output 213 of the second multiplier 212 values $J_m \cdot C_m \cdot \Delta f_m$ and at an output 214 of the first multiplier 211 values $J_m \cdot C_m$.

These outputs 213, 214 of the weighting unit 210 are input to the averaging unit 220. The averaging unit 220 comprises a first accumulator (AC) 221, a second accumulator (AC) 222 and a divider (DIV) 223. The accumulators 221, 222 accumulate their inputs over $m = 1, \ldots, M$ and pass their respective results to the divider 223. The divider 223 generates the overall frequency-offset $\overline{\Delta f}$ according to $$\overline{\Delta f} = \frac{\sum_{m=1}^{M} J_m C_m \Delta f_m}{\sum_{m=1}^{M} J_m C_m}. \quad (13)$$

Averaging schemes different from the averaging scheme exemplified above may be employed.

The overall frequency-offset estimate $\overline{\Delta f}$ may be output periodically at a time interval given by $L_{avg}$. For instance, in an UMTS communications system, using as symbols $r_{i,m}$ pilot symbols transmitted via the common pilot channel (CPICH), assuming $L_{avg} = 150$ yields one value of $\overline{\Delta f}$ per frame (frame duration is 10 ms).

Further, with regard to circuitry design, as signal processing upstream of the averaging unit 220 is accomplished separately for each signal source m, it is either possible to duplicate the components arranged upstream of the averaging unit 220 or to operate them in a time multiplex cycle running successively over $m = 1, \ldots, M$.

In the example described above, both the frequency-offsets $\Delta f_m$ and the quantities $C_m$ representative of a signal-to-noise ratio and used as weighting factors are computed on the basis of the same input data and on the basis of a differential phase estimation approach. That way, weighting factors $C_m$ include all effects relevant for weighting but not known by external sources and exclude all effects external sources are subject to while the frequency-offset estimates $\Delta f_m$ are not. Further, as the weighting factors $C_m$ may be based on the same time interval as the frequency-offset estimates $\Delta f_m$, errors introduced by non-synchronized weighting factor sources are excluded. Thus, the above scheme for generating weighting factors $C_m$ frequency-offset estimates $\Delta f_m$ may be beneficial in view of low hardware implementation expenditure and high accuracy. However, instead of computing the frequency-offsets $\Delta f_m$ from the averaged phasors $P_m^{av}$, frequency-offsets $\Delta f_m$ as used by the combiner 104 may also be computed elsewhere in the receiver, i.e. by different algorithms using other signal processing devices not shown in the foregoing. In this case, the argument unit 105 may be omitted.

Figure 4:
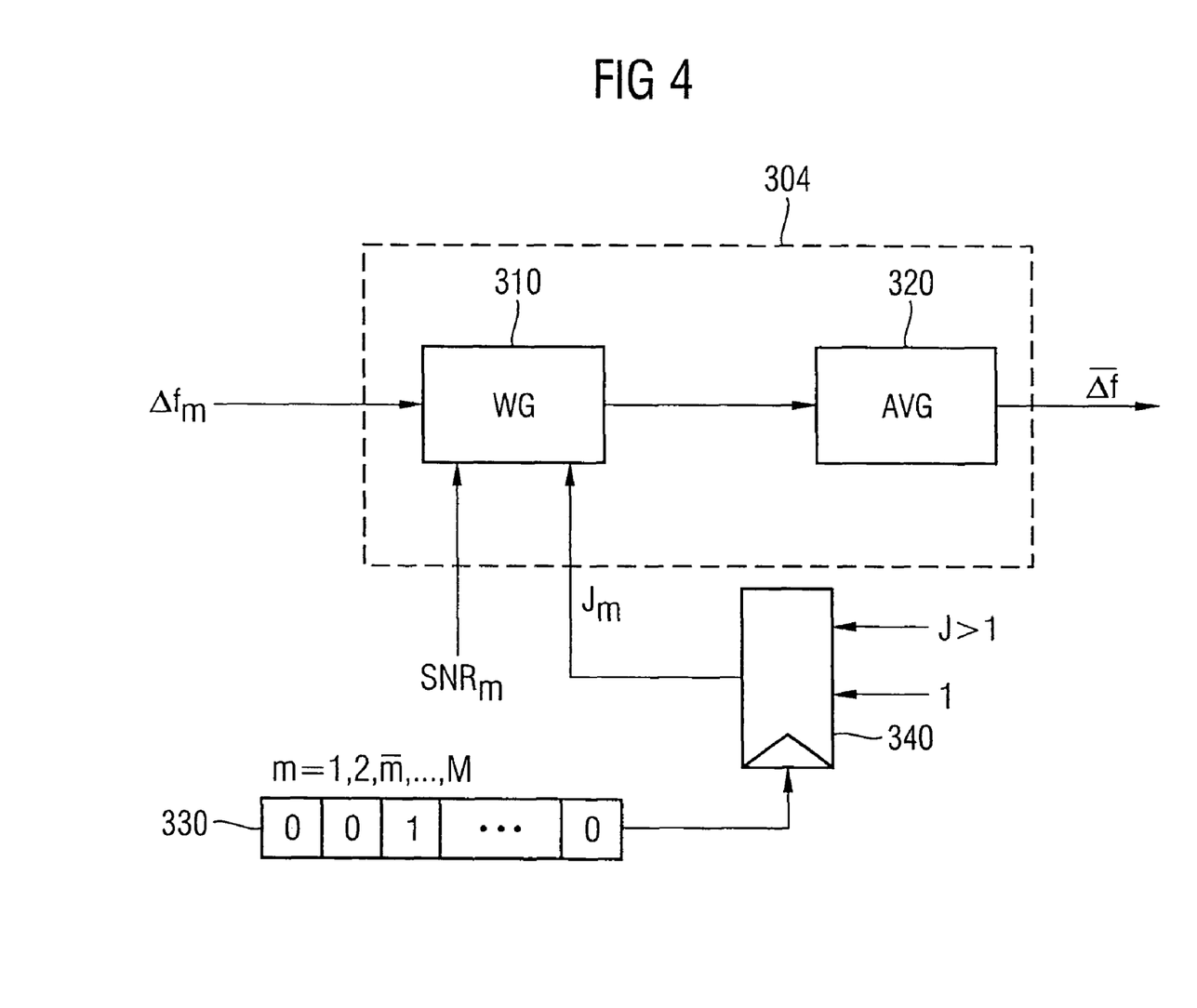
FIG. 4 is a schematic diagram of a device for combining multiple frequency-offset estimates in a receiver.

According to another embodiment, the concept of source-importance weighting may be implemented in virtually any combiner independent of how frequency-offset estimates $\Delta f_m$ and quantities representative of the signal-to-noise ratios are established. FIG. 4 illustrates a circuitry according to the general concept of source-importance weighting adjustment for an overall frequency-offset $\overline{\Delta f}$ calculation. Combiner 304 may be similar to combiner 104 as shown in FIG. 3. Optional discarding unit 200 may be omitted. Averaging unit 320 may be designed identical to averaging unit 220. Weighting unit 310 may, for example, use signal-to-noise ratios $SNR_m$ or values $C_m$ for signal quality weighting purposes. Again, the signal source-specific frequency-offset estimates $\Delta f_m$ may be provided by different circuitry than shown in FIG. 2. Additionally, signal source-specific signal-to-noise ratios $SNR_m$ communicated to the weighting unit 310 may be computed in a conventional fashion, i.e. not on the basis of a differential phase estimation approach (by using phasors) as explained above, but elsewhere in the receiver.

Moreover, it is possible in one embodiment that weighting of the frequency-offset estimates $\Delta f_m$ with the quantities representative of the signal-to-noise ratios is omitted. In this case, frequency-offset estimates $\Delta f_m$ are simply weighted by the signal content dependent weighting factors $J_m$. Then, the combiner 104 may not receive the quantities $C_m$ representative of a signal-to-noise ratio. Thus, the discarding unit 200 and the multiplier 211 can be omitted and the signal content dependent weighting factors $J_m$ may be coupled to the input of the multiplier 212 (which receives at the other input the frequency-offset estimates $\Delta f_m$). As to FIG. 4, in this case the combiner 304 must not receive the quantities $SNR_m$ (which may be represented by the quantities $C_m$ in FIG. 3).

Register 330 contains a number of signal source service flags each associated with a specific signal source (e.g., base station) m and indicative of whether the respective signal source m provides a specific service, for instance HSDPA. If a flag has the value 1, the service is provided, and if the flag has the value 0, the service is not provided. Here, signal source $\overline{m}$ (and probably also other signal sources) provides this service. If the flag has the value 1, multiplexer 340 is controlled to output $J > 1$. Otherwise, if the flag has the value 0, multiplexer 340 outputs the value 1. Thus, if during a communication to multiple signal sources one signal source activates a specific service mode (e.g. HSDPA), the frequency-offset compensation in the receiver is improved for the signal transmitted by signal source $\overline{m}$. It is apparent from the above that for different services different values of J may be used in order to differentiate between the importance of a plurality of services.

Features relating to the concept of source-importance weighting explained in conjunction with the circuitry shown in FIG. 4 may be applied in the aforementioned embodiments and vice versa. Further, features relating to the concept of estimating an overall frequency-offset $\overline{\Delta f}$ on the basis of a plurality of frequency-offset estimates $\Delta f_m$ as presented in conjunction with FIGS. 1 to 3 are applicable to the circuitry as shown in FIG. 4 and vice versa.

Figure 5:
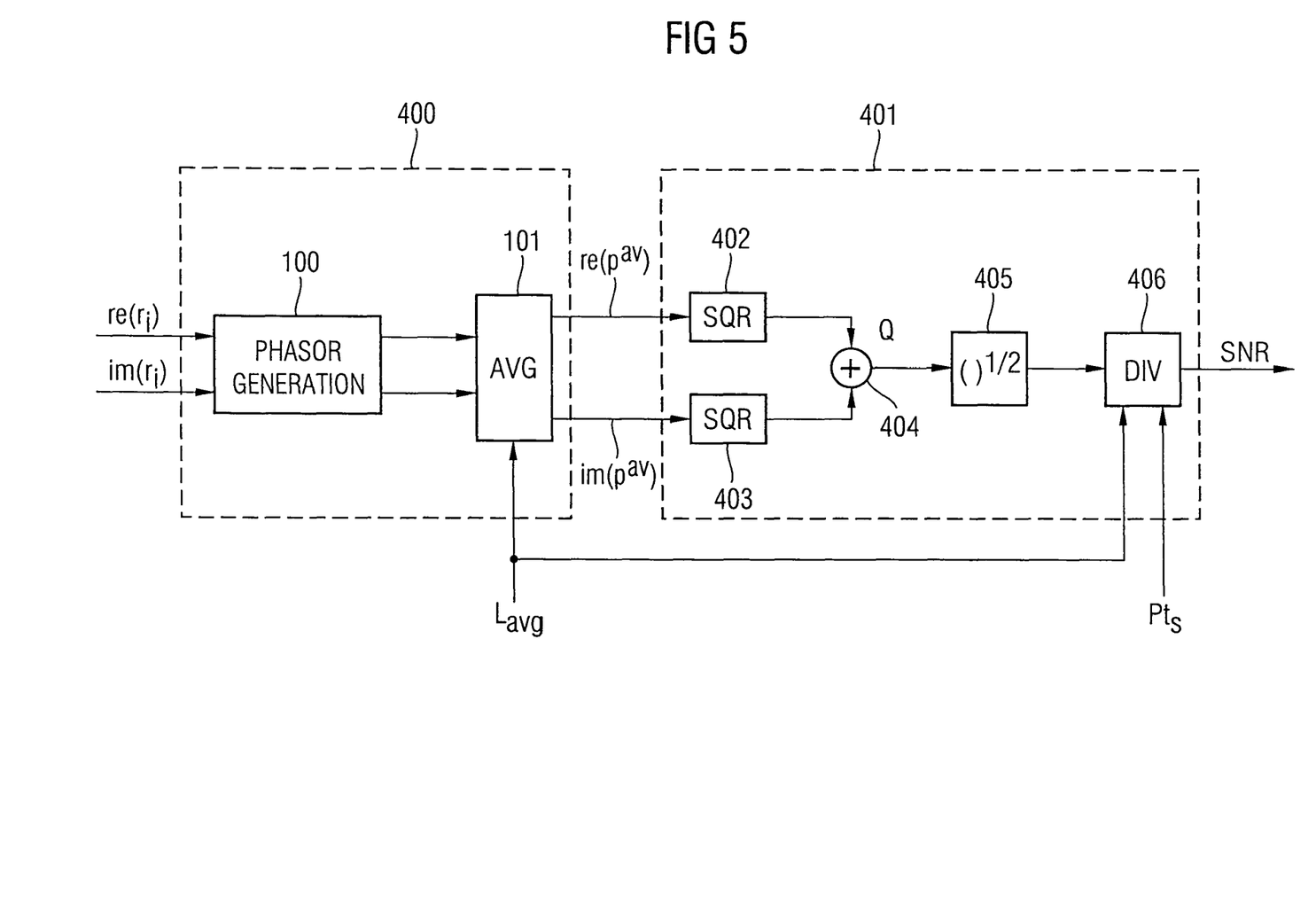
FIG. 5 is a schematic diagram of a device for calculating signal-to-noise ratio estimates.

According to another embodiment of the invention, circuitry for calculating a signal-to-noise ratio is shown in FIG. 5. Such circuitry may be used in virtually any kind of receiver in communications systems, i.e. its use is neither limited to mobile communications systems nor to radio systems. Concerning mobile communication systems, it may be implemented in a base station or in a mobile station or both. As known in the art, estimates of signal-to-noise ratio are used by various circuit parts in a receiver. For instance, in a RAKE receiver, outputs of single RAKE fingers can be combined in a combiner using signal-to-noise ratio estimates associated with each finger output (i.e. associated with a component of a signal which is transmitted via a specific propagation path of the radio channel). Thus, signal-to-noise ratio estimation according to this embodiment of the invention may, for example, also be used to provide signal-to-noise ratio estimates for a RAKE combiner.

The circuitry depicted in FIG. 5 comprises a phase-shift estimation unit 400 operative to generate averaged phasors $p^{av}$ from an incoming complex-valued data stream $r_i$. The phase-shift estimation unit 400 comprises a phasor generation unit 100 and an averaging unit 101, which may be designed according to the corresponding units explained above. The averaged phasor $p_{av}$ is thus formed according to equation (2) (without index m). As already mentioned, the averaged phasor $p^{av}$ is representative of a phase-shift that occurred in the input data signal $r_i$ over a number $L_{avg}$ of consecutive data samples. $L_{avg}$ may be equal to 1 but typically, a greater averaging length is used.

The averaged phasors $p^{av}$ are fed into a phase-shift processing unit 401. Phase-shift processing unit 401 comprises a first square (SQR) unit 402, a second square (SQR) unit 403, an adder 404, a root extraction unit 405 and a divider (DIV) 406. The first square unit 402 receives the real part of the averaged phasor $p^{av}$ and its output is connected to a first input of the adder 404. The second square unit 403 receives the imaginary part of the averaged phasor $p^{av}$ and its output is connected to a second input of the adder 404. At an output of the adder 404, quantity Q according to equation (3) is calculated.

In root extraction unit 405, $Q^{1/2}$ is calculated. The square root of Q corresponds to the absolute value of the complex-valued averaged phasor $p^{av}$ and is proportional to the signal-to-noise ratio SNR.

Provided that the energy level per data sample is $Pt_s$, the signal-to-noise ration SNR is to be calculated according to $$SNR = \frac{\sqrt{Q}}{2Pt_s L_{avg}}. \tag{14}$$

To this end, the divider 406 divides the square root of Q by $2 \cdot Pt_s \cdot L_{avg}$ and outputs one estimate of signal-to-noise ratio estimate SNR per $L_{avg}$ data samples $r_i$.

In many cases, it may not be necessary to calculate the signal-to-noise ratio but it may be sufficient to generate a quantity which is proportional to the signal-to-noise ratio SNR or even a quantity which is representative of the signal-to-noise ratio SNR according to a unique functional relationship. In such cases, the phase-shift processing unit 401 may e.g. output the result of the adder 404 (optionally divided by $L_{avg}^2$) or the output of the root extraction unit 405 (optionally divided by $L_{avg}$), respectively.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention should, therefore, be determined with reference to the appended claims along with the scope of equivalents to which such claims are entitled.

It is emphasized that the Abstract is provided to comply with 37 C.F.R. section 1.72(b) requiring an abstract that will allow the reader to quickly ascertain the nature and gist of the technical disclosure. It is submitted with the understanding, that it will not be used to interpret or limit the scope or meaning of the claims.

The invention claimed is:

1. A device for calculating an overall frequency-offset estimate from a plurality of frequency-offset estimates, comprising:
   a receiver unit configured to receive a plurality of complex-valued data streams;
   a phase shift estimation unit configured to generate a phase shift quantity representative of a phase shift over a number of consecutive data samples in the respective data stream;
   a phase shift processing unit coupled to the phase shift estimation unit and configured to calculate a quantity related to the signal-to-noise ratio associated with a data stream on the basis of the respective phase shift quantity;
   a frequency-offset estimation unit configured to generate frequency-offset estimates associated with the respective data streams; and
   a combiner configured to calculate the overall frequency-offset estimate based on the frequency-offset estimates and the quantities related to the signal-to-noise ratios.

2. The device according to claim 1, wherein an input of the frequency-offset estimation unit is coupled to an output of the phase shift estimation unit.

3. The device according to claim 1, wherein the phase shift estimation unit comprises a multiplier for multiplying a data sample with a conjugate complex of a preceding data sample in the received data stream.

4. The device according to claim 3, wherein the phase shift estimation unit comprises an averaging unit having an input coupled to an output of the multiplier.

5. The device according to claim 1, wherein the combiner comprises a comparator configured to compare the quantities related to the signal-to-noise ratios with a threshold value.

6. The device according to claim 1, wherein the combiner comprises a first weighting stage configured to weight the quantities related to the signal-to-noise ratios with a first weight factor dependent on a signal content of the data stream associated with the respective signal-to-noise ratio.

7. The device according to claim 6, wherein the first weight factor is dependent on a service indicator transmitted by a signal source with respect to the respective data stream.

8. The device according to claim 1, wherein the combiner comprises a second weighting stage configured to weight the frequency-offset estimates with a second weight factor dependent on the signal-to-noise ratio associated with the respective frequency-offset estimate.

9. The device according to claim 8, wherein the combiner comprises an averaging stage configured to average the weighted frequency-offset estimates to generate the overall frequency-offset estimate.

10. A device for calculating an overall frequency-offset estimate from a plurality of frequency-offset estimates, comprising:
    a receiver unit configured to receive a plurality of complex-valued data streams;

a frequency-offset estimation unit configured to generate frequency-offset estimates associated with the respective data streams;

a weighting stage configured to weight the frequency-offset estimates with a respective weight factor that is dependent on an importance of the associated data stream for signal demodulation; and an averaging stage configured to average the weighted frequency-offset estimates to generate the overall frequency-offset estimate.

11. The device of claim 10, wherein the weight factor is dependent on whether or not a specific service is supported by a signal source transmitting the respective signal.

12. A device for calculating an overall frequency-offset estimate from a plurality of frequency-offset estimates, comprising:

a weighting stage configured to weight the frequency-offset estimates with a respective weight factor that is dependent on a signal content of the signal from which the respective frequency-offset estimate was derived;

an averaging stage configured to average the weighted frequency-offset estimates to generate the overall frequency-offset estimate; and a calculation unit configured to calculate a plurality of quantities which are each related to a signal-to-noise ratio associated with a signal from which the respective frequency-offset estimate was derived, wherein the weighting stage is further configured to weight the frequency-offset estimates with the quantities which are each related to a signal-to-noise ratio.

13. A device for calculating a quantity related to a signal-to-noise ratio of a complex-valued data stream, comprising:

a phase shift estimation unit configured to generate a phase shift quantity representative of a phase shift occurred over a number of consecutive samples in the data stream, and a phase shift processing unit coupled to the phase shift estimation unit and configured to calculate a quantity related to the signal-to-noise ratio associated with the complex-valued data stream on the basis of the respective phase shift quantity.

14. The device of claim 13, wherein the phase shift processing unit comprises a squaring element.

15. The device of claim 13, wherein the phase shift processing unit comprises a dividing stage.

16. The device of claim 15, wherein the divisor used in the dividing stage comprises a factor representative of a power level of the complex-valued data stream.

17. A method for calculating an overall frequency-offset estimate from a plurality of frequency-offset estimates, comprising:

receiving a plurality of complex-valued data streams;

estimating for each data stream a phase shift quantity representative of a phase shift occurring over a number of consecutive data samples in the respective data stream;

calculating for each data stream a quantity related to the signal-to-noise ratio in the respective data stream on the basis of the phase shift quantity associated with the respective data stream;

generating frequency-offset estimates associated with the respective data streams using the estimated phase shift quantities and the quantities related to the signal-to-noise ratio; and combining the frequency-offset estimates on the basis of the quantities related to the signal-to-noise ratios to yield the overall frequency-offset estimate.

18. The method of claim 17, wherein estimating the phase shift quantity comprises multiplying a data sample by a complex conjugate of a preceding data sample in the respective data stream.

19. The method of claim 18, wherein estimating the phase shift quantity comprises summing a plurality of multiplication results.

20. The method of claim 17, wherein calculating the quantity related to the signal-to-noise ratio comprises squaring the respective phase shift quantity.

21. The method of claim 17, wherein combining the frequency-offset estimates comprises weighting the quantities related to the signal-to-noise ratios with a first weight factor that is dependent on a signal content of the data stream associated with the respective signal-to-noise ratio.

22. A method for calculating an overall frequency-offset estimate from a plurality of frequency-offset estimates, comprising:

receiving a plurality of complex-valued data streams;

generating frequency-offset estimates associated with the respective data streams;

weighting the frequency-offset estimates with a respective weight factor that is dependent on an importance of the associated data stream for signal demodulation; and averaging the weighted frequency-offset estimates to generate the overall frequency-offset estimate.

23. The method of claim 22, wherein the weight factor is adjusted dependent on whether or not a specific service is supported by a signal source transmitting the respective signal.

24. A method for calculating an overall frequency-offset estimate from a plurality of frequency-offset estimates, comprising:

weighting the frequency-offset estimates with a respective weight factor that is dependent on the signal content of the signal from which the respective frequency-offset estimate was derived; and averaging the weighted frequency-offset estimates to generate the overall frequency-offset estimate;

calculating a plurality of quantities that are each related to a signal-to-noise ratio associated with a signal from which the respective frequency-offset estimate was derived; and weighting the frequency-offset estimates with the quantities that are each related to a signal-to-noise ratio.

25. A method for calculating a quantity related to a signal-to-noise ratio of a complex-valued data stream, comprising:

generating a phase shift quantity representative of a phase shift that occurred over a number of consecutive samples in the data stream; and calculating a quantity related to the signal-to-noise ratio associated with a the complex-valued data stream based on the respective phase shift quantity.

26. The method of claim 25, wherein calculating a quantity related to the signal-to-noise ratio comprises calculating the absolute value of the phase shift quantity.

27. The method of claim 26, wherein calculating a quantity related to the signal-to-noise ratio comprises dividing the calculated absolute value of the phase shift quantity by a factor representative of a power level of the complex-valued data stream.

* * * * *